United States Patent [19]
Johnson et al.

[11] Patent Number: 5,740,196
[45] Date of Patent: Apr. 14, 1998

[54] END CAPS AND ELBOWS FOR COOLING COILS FOR AN ELECTRIC ARC FURNANCE

[75] Inventors: Eric N. Johnson, Clinton; Roger E. Johnson, Camanche; Craig S. Johnson, Clinton, all of Iowa

[73] Assignee: J.T. Cullen Co., Inc., Fulton, Ill.

[21] Appl. No.: 621,429

[22] Filed: Mar. 25, 1996

[51] Int. Cl.⁶ ........................................ F27D 1/12
[52] U.S. Cl. ........................ 373/71; 373/74; 373/76
[58] Field of Search ................. 373/71–76; 266/241, 266/190; 110/336; 432/238, 250, 77; 165/171, 172; 285/124

[56] References Cited

U.S. PATENT DOCUMENTS

| | | | |
|---|---|---|---|
| 1,712,386 | 5/1929 | Harney | 165/171 |
| 1,767,652 | 6/1930 | Daley | 165/172 |
| 2,258,020 | 11/1941 | Laurent | 285/124 |
| 3,344,811 | 10/1967 | Hoffmann | 285/124 |
| 3,464,402 | 9/1969 | Collura | 165/171 |
| 3,876,818 | 4/1975 | Fitzke | 373/76 |
| 4,207,060 | 6/1980 | Zangs | 432/77 |
| 4,455,017 | 6/1984 | Wunsche | 266/190 |
| 4,637,034 | 1/1987 | Grageda | 373/73 |
| 4,903,640 | 2/1990 | Howard | 122/6 A |
| 5,197,080 | 3/1993 | Johnson et al. | 373/76 |
| 5,289,495 | 2/1994 | Johnson | 373/74 |
| 5,426,664 | 6/1995 | Grove | 373/76 |

FOREIGN PATENT DOCUMENTS

| | | | |
|---|---|---|---|
| 667 460 A | 8/1995 | European Pat. Off. | |
| 1 053 501 A | 2/1954 | France | |
| 1146258 | 11/1957 | France | 165/172 |
| 2 422 126 A | 11/1979 | France | |
| 2 459 436 A | 1/1981 | France | |
| 880884 | 5/1953 | Germany | 285/157 |
| 32 02 574 C | 2/1983 | Germany | |
| 251225 | 10/1947 | Switzerland | 165/172 |
| 490454 | 8/1938 | United Kingdom | 16/172 |
| 1301098 | 12/1972 | United Kingdom | 165/172 |

*Primary Examiner*—Tu B. Hoang
*Attorney, Agent, or Firm*— Zarley,McKee,Thomte, Voorhees,&Sease

[57] ABSTRACT

An end cap is provided for adjacent pipes in the cooling coils of an electric air furnace. Each end cap includes parallel opposite side walls and a curved end portion connecting the side walls. The side walls and end portion define a perimeter edge, the outer portion of which is beveled. The end cap includes a pair of tabs extending from each side wall. The tabs partially fill the crevice between adjacent end pipes so as to provide a stronger weld between the end cap and the pipes. Internal turning vanes in the end cap minimize turbulence of the liquid coolant flowing through the pipes. Similar turning vanes can be provided in the 90° elbows of the cooling coils.

17 Claims, 2 Drawing Sheets

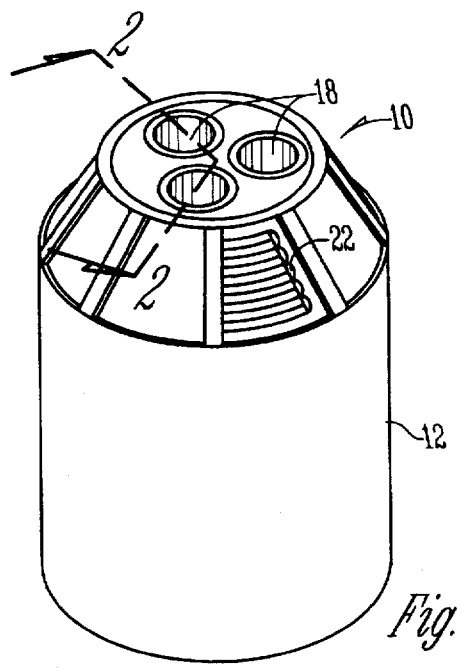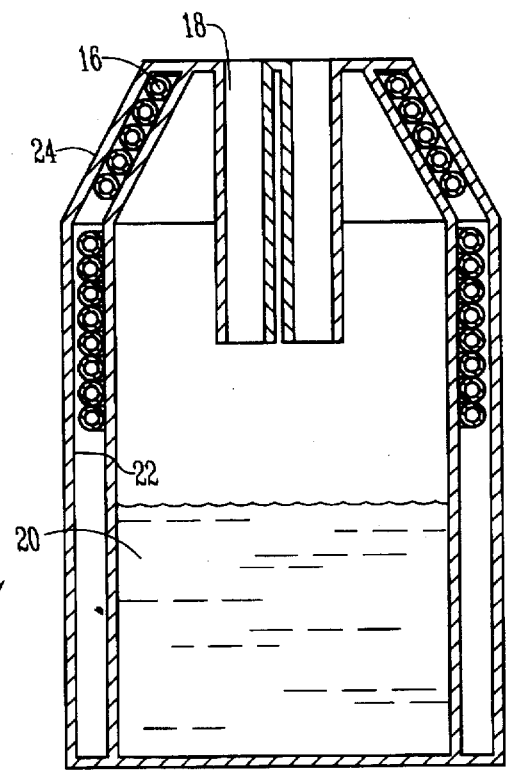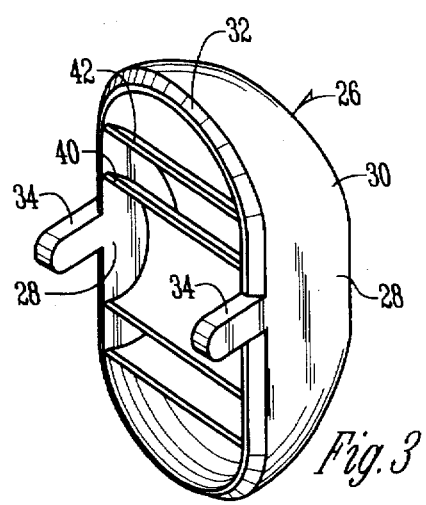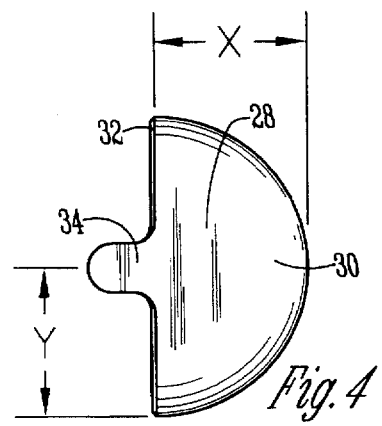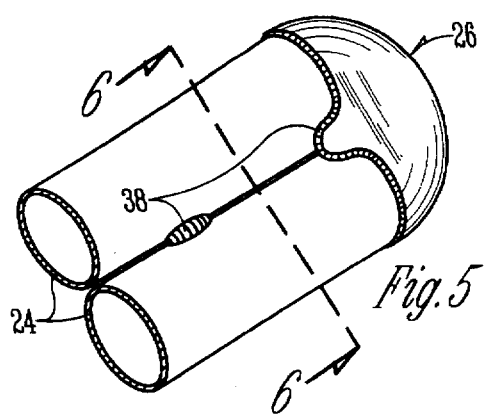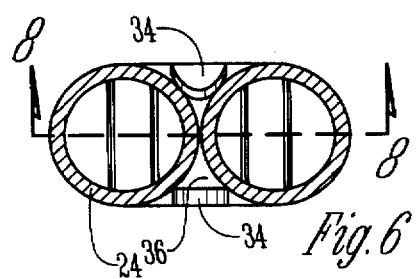

5,740,196

1

END CAPS AND ELBOWS FOR COOLING COILS FOR AN ELECTRIC ARC FURNACE

BACKGROUND OF THE INVENTION

Electric arc smelting furnaces are used to remanufacture steels from scrap metals. The scrap metals are heated to a high temperature sufficient to melt the metals to a liquid form. The molten steel then can be processed for further uses.

The melting process imposes much thermal, chemical and mechanical stresses on the furnaces. Consequently, much attention and effort must be given to the structural integrity of the furnaces to assure safe operation and production. Frequent maintenance schedules must be maintained on the furnaces, thereby making recycling of steel very costly. In an attempt to alleviate the stresses, and to lower the operating cost of recycling steels, liquid cooling systems are installed on the furnaces. One such cooling system is disclosed in U.S. Pat. No. 4,207,060, which utilizes a series of cooling pipe coils. Generally, the coils are formed from adjacent pipe sections with a curved end cap welded to the ends of adjacent pipes to form a serpentine path for a liquid coolant flowing through the coils. The coolant is forced through the pipes under pressure to maximize heat transfer.

End caps on the cooling coils typically have two different shapes, curved or rectangular. While rectangular end caps are easier to manufacture, when liquid coolant passes through a rectangular end cap, the corners of the end cap tend to cause turbulent flow, bubbles, and vapor, which reduce thermal conductivity and cause localized overheating. Therefore, greater strength is required for rectangular end caps.

Curved or semi-circular end caps allow for a smoother, more laminate fluid flow. Thus, heat transfer efficiency is increased by maximizing surface contact between the coolant and internal coil surfaces. Also, localized overheating is reduced and strength requirements are decreased.

The junction where the two pipe join the end caps is an important area of concern for efficient and safe operation of an electric arc smelting furnace. At this junction, liquid coolants experience a sharp 180 degree turn and a change in fluid pressure. The change in fluid pressure at the junction can be caused by a slower speed of flow, a drop in flow volume, a greater friction between the liquid and the surface of the end caps, a formation of air bubbles, a formation of vapors, a dead flow area, a collection of mineral deposits due to the irregular shape of the welding compounds, a turbulent flow, and a greater heat accumulation due to a slower rate of thermal conductivity.

Also, since the forced fluid flow generates high pipe pressure, the end cap and the parallel pipes must be welded strong enough to withstand the pressure. The only welding surfaces of known end caps are the rims, which makes welding difficult between the cap and the pipe ends, particularly in the valley area between the adjacent pipes.

Applicants' U.S. Pat. No. 5,197,080 discloses an end cap for the cooling coils of an electric arc furnace. The end cap of this patent improved the cooling pipe system of the furnaces. However, in more recent years, the operating temperatures of the furnaces has increased significantly. Thus, a need exists for an even more efficient and effective end cap, as well as 90° elbows, for the cooling systems of the furnaces.

Therefore, a primary objective of the present invention is the provision of improved end caps and improved elbows for the cooling pipe systems of electric arc furnaces.

2

Another objective of the present invention is the provision of end caps and elbows for an electric arc furnace cooling pipes wherein the caps and elbows have turning vanes to reduce turbulence of the flowing coolant, and thereby decrease pressure drops and increase flow rates.

A further objective of the present invention is the provision of cooling pipe end caps and elbows which improve the structural integrity of the liquid cooling system in electric arc furnaces.

A further objective of the present invention is the provision of improved end caps and elbows for electric arc furnace cooling systems which enhances the thermal conductivity of the cooling system.

SUMMARY OF THE INVENTION

The present invention is directed toward end caps and elbows for the liquid cooling coils of an electric arc furnace. The end cap connects the ends of adjacent parallel pipes so that water or other coolant will flow from one pipe into the next pipe. The elbow connects the ends of perpendicular pipes. Turning vanes are provided in the end caps and elbows to reduce turbulent fluid flow and improve heat transfer efficiency.

BRIEF DESCRIPTION OF THE DRAWINGS

FIG. 1 is a view of an electric arc smelting furnace.

FIG. 2 is a sectional elevation view taken along lines 2—2 of FIG. 1.

FIG. 3 is a perspective view of the end cap having the turning vanes of the present invention.

FIG. 4 is a side sectional view of the end cap.

FIG. 5 is a perspective view showing the end caps welded at the ends of two parallel cooling pipes.

FIG. 6 is a sectional view taken along lines 6—6 of FIG. 5.

DETAILED DESCRIPTION OF THE PREFERRED EMBODIMENT

Figure 7:
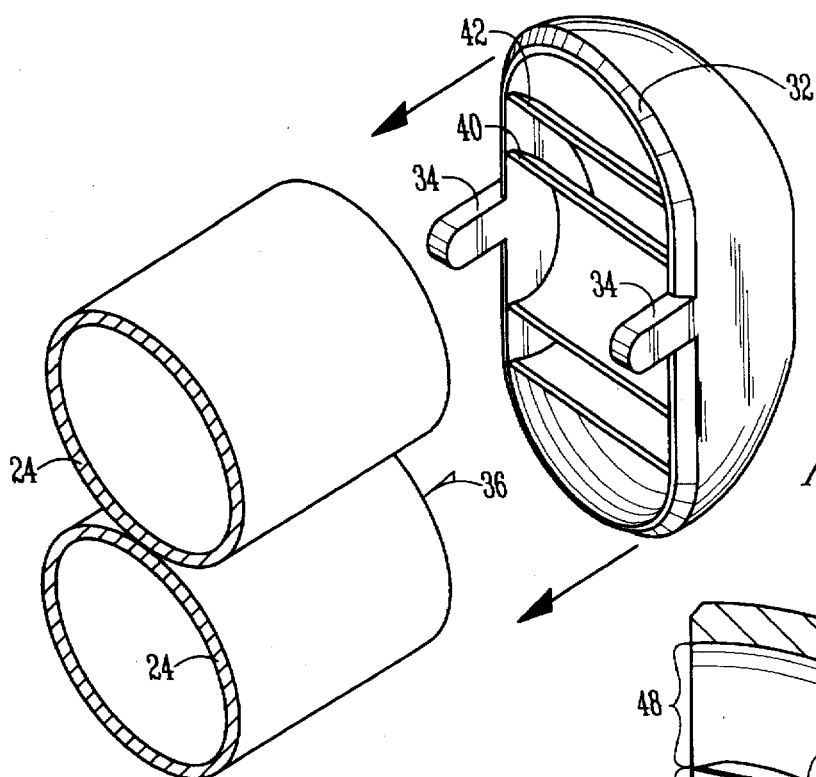
FIG. 7 is an exploded perspective view similar to FIG. 5.

In the drawings, the reference number 10 generally designates an electric arc furnace. The furnace 10 includes a side wall 12, a bottom 14, and a top 16. Top 16 has a truncated conical shape, with openings 18 therein for receiving the electrodes. Furnace 10 is used to melt steel into molten slag 20.

The side walls 12 and top 16 of furnace 10 include a plurality of cooling coils 22. Coils 22 are formed from a plurality of adjacent pipes 24. The basic construction of furnace 10, including pipes 24 is conventional.

The present invention is directed towards an end cap 26 used to connect the ends of adjacent pipes 24. Each end cap 26 is semi-circular in cross section, and includes opposite parallel side walls 28 integrally formed with a curved end portion 30. The curvature of end portion 30 is constant so that the cross sectional area of the end cap taken along any radius is constant. As seen in FIG. 4, the depth X of the end cap is equal to the radius Y from the midpoint of the rim to the upper or lower edge. Radius Y equals the diameters of pipe 24.

End cap 26 has a perimeter edge or a rim 32. The outer portion of rim 32 is beveled, as best seen in FIG. 4, to facilitate welding of the end cap to the pipe.

End cap 26 also includes a pair of ears or tabs 34 extending outwardly from the midpoint of the sides 28. During the manufacture of end cap 26, tabs 34 are formed coplanar with side walls 28, and are later bent inwardly, as described below.

End cap 26 is welded to the ends of adjacent pipes 24 in the cooling coils of furnace 10. In assembling the pipes and end caps, the cap is positioned in alignment with the ends of pipe 24 and tabs 34 are bent inwardly so as to fill the valley or crevice 36 therebetween. As shown in FIG. 6, the upper tab has been bent inwardly and the lower tab has not yet been bent. End cap 26 is then welded to the ends of pipes 24. Tab 34 provides for a stronger weld, since it minimizes the amount of weld compound which must be utilized in the area of valley 36 between the pipes 24. Furthermore, the additional surface area provided by tabs 34 and the beveled portion of rim 32 provide for a stronger weld.

End cap 26 is preferably made of 516 grade 70 plate steel, or other high quality commercial grade steel. Cap 26 is forged, either hot or cold, or may be formed by casting.

Figure 8:
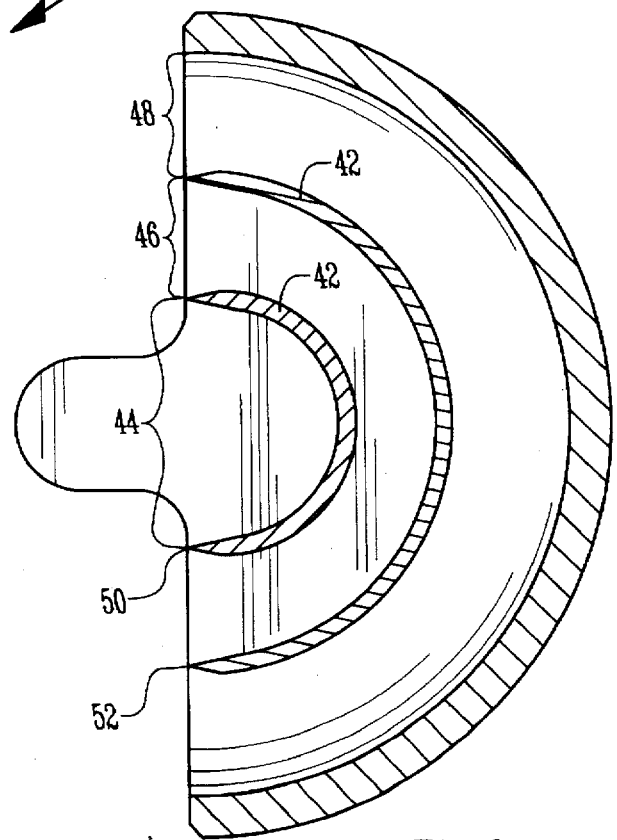
FIG. 8 is a sectional view of the end cap taken along lines 8—8 of FIG. 6.

The end cap 26 includes one or more turning vanes. As seen in FIGS. 3, 6, 7 and 8, in the preferred embodiment, the end cap 26 has a first turning vane 40 and a second turning vane 42. The turning vanes 40 and 42 define fluid flow channels 44, 46, and 48 as best seen in FIG. 8, through which the cooling fluid flows. These channels 44, 46, 48 direct the cooling fluid, and change the direction of flow 180° from the parallel pipes 24. The turning vanes 40, 42 thus reduce the fluid flow turbulence, and thereby reduce any pressure drop during the change of direction of the fluid, and thereby enhance fluid flow through the cooling system. Such enhanced fluid flow, in turn, increases the efficiency of the cooling system. As seen in FIG. 8, the terminal ends 50, 52 of the vanes 40, 42, respectively, are beveled, rather than blunt, so as to further minimize fluid turbulence.

The vanes 40, 42 have a curvature which is parallel to the curvature of the end cap 26. The vanes 40, 42 are preferably individually welded to the end cap 26. To simplify manufacture, the vanes 40, 42 may be interconnected with a connecting member (not shown), such that only the smaller vane 40 need be welded to the end cap 26, and the larger vane 42 will be fixed in position by the connecting member.

Figure 9:
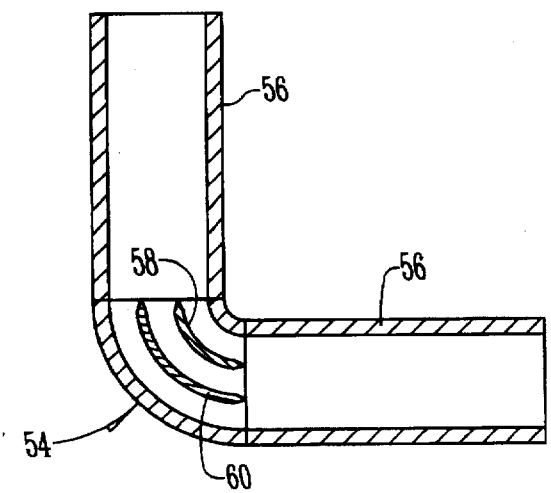
FIG. 9 is a side elevational view of an elbow having the turning vanes of the present invention.

FIG. 9 shows a 90° elbow 54 having a tight radius, for interconnecting a pair of perpendicular pipes 56. The elbow 54 is welded to the end of each pipe 56 in a conventional manner. The elbow 54 includes a pair of turning vanes 58, 60, which are similar to the vanes 40, 42 of the end cap 26. It is understood that the end cap 26 and the elbow 54 may have one or more turning vanes depending, at least in part, upon the size of the end cap or elbow.

In operation, water or another liquid coolant is forced through coils 22 so as to cool furnace 10. As the water or coolant passes through one of pipes 24, its direction is reversed 180° by end cap 26 so as to flow through the adjacent pipe 24. The curvature of end cap 26 and the turning vanes 40, 42 allow for smooth fluid flow at rates of approximately 7–9 feet per second. This construction of end cap 26 minimizes any changes in pressure as the coolant changes direction, inhibits the formation of bubbles or vapor, minimizes turbulent flow, and accordingly enhances the thermal conductivity of the cooling coils 22. Similar improved fluid flow is achieved with the elbow 54 with internal turning vanes 58, 60.

From the foregoing, it can be seen that the present invention accomplishes at least all of the stated objectives.

What is claimed is:

1. An improved end cap for providing improved fluid flow through pipes of a cooling system of an electric arc furnace, the end cap comprising:
   opposite side walls;
   a curved end portion interconnecting the side walls;
   a perimeter edge defined by the side walls and end portion; and
   a curved turning vane mounted between the side walls for defining separate fluid flow channels in the end cap.

2. The improved end cap of claim 1 wherein turning vane has a smaller radius than the end portion of the cap.

3. The improved end cap of claim 1 wherein the turning vane has a curvature parallel to the curvature of the end portion.

4. The improved end cap of claim 1 wherein the turning vane has opposite sides which are welded to the side walls of the end cap.

5. The improved end cap of claim 1 wherein the turning vane has opposite ends, the ends being tapered to reduce fluid turbulence.

6. The improved end cap of claim 1 further comprising a second turning vane mounted between the side walls to define another fluid flow channel in the end cap.

7. A pipe connector for providing fluid communication between two pipes, the connector being sealably connected to the ends of the pipes and comprising:
   a curved external wall for sealable connection to the ends of the pipes; and
   an internal turning vane mounted within the connector to define fluid flow channels therein.

8. The pipe connector of claim 7 wherein the turning vane has a curvature parallel to the curvature of the external wall.

9. The pipe connector of claim 7 wherein the pipe connector is an end cap having a semi-circular cross section.

10. The pipe connector of claim 7 wherein the pipe connector is an elbow having opposite ends oriented at 90° with respect to one another.

11. The pipe connector of claim 7 wherein the turning vane has opposite sides which are welded to the side walls of the connector.

12. The pipe connector of claim 7 wherein the turning vane has opposite ends, the ends being tapered to reduce fluid turbulence.

13. A cooling system for an electric arc furnace, comprising:
   a plurality of adjacent pipes each having opposite open ends;
   a plurality of curved end caps, each cap being connected to a pair of adjacent pipes in covering relation over the open ends so as to provide fluid communication between the adjacent pipes;
   at least one curved turning vane mounted within each end cap to define a plurality of fluid flow channels in each end cap.

14. The cooling system of claim 13 wherein each end cap has a curved wall and each turning vane has a curvature so as to be parallel to the curved wall of the end cap.

15. The cooling system of claim 13 wherein the turning vane has a smaller radius than the associated end cap.

16. The cooling system of claim 13 wherein the turning vane has opposite ends, the ends being tapered to reduce fluid turbulence.

17. The cooling system of claim 13 wherein the end cap has opposite sides and the turning vane extends between the opposite sides of the end cap.

* * * * *